United States Patent [19]

Nakata

[11] Patent Number: 5,670,064

[45] Date of Patent: Sep. 23, 1997

[54] LASER BEAM MACHINE USING OPTICAL COMPONENT TO MODIFY LASER BEAM AS DESIRED

[75] Inventor: Yoshinori Nakata, Yamanashi, Japan

[73] Assignee: Fanuc Ltd., Yamanashi, Japan

[21] Appl. No.: 389,161

[22] Filed: Feb. 15, 1995

[30] Foreign Application Priority Data

Mar. 11, 1994 [JP] Japan .................................. 6-040673

[51] Int. Cl.$^6$ .................................................. B23K 26/06
[52] U.S. Cl. ................................ 219/121.6; 219/121.73
[58] Field of Search ........................... 219/121.6, 121.73, 219/121.74, 121.75; 372/99, 108; 359/663

[56] References Cited

U.S. PATENT DOCUMENTS

| | | | |
|---|---|---|---|
| 4,402,574 | 9/1983 | McConnel | 219/121.75 |
| 4,705,367 | 11/1987 | Eckbreth et al. | 219/121.75 |
| 4,734,558 | 3/1988 | Nakano et al. | 219/121.73 |
| 4,753,521 | 6/1988 | Deserno | 359/663 |
| 4,937,424 | 6/1990 | Yasui et al. | 219/121.6 |
| 4,942,588 | 7/1990 | Yasui et al. | 372/99 |
| 5,136,136 | 8/1992 | Karube et al. | 219/121.73 |
| 5,327,447 | 7/1994 | Mooradian | 372/99 |
| 5,493,095 | 2/1996 | Bruschi et al. | 219/121.75 |
| 5,506,858 | 4/1996 | Takenaka et al. | 372/99 |
| 5,557,630 | 9/1996 | Scaggs | 372/99 |

*Primary Examiner*—Geoffrey S. Evans
*Attorney, Agent, or Firm*—Staas & Halsey

[57] ABSTRACT

A laser beam machine capable of creating the optimum machining region of a laser oscillator as desired and with ease. The laser beam emitted from an output mirror diverges at a diverging angle without the propagating characteristic that its diameter diminishes in the course of transmission. An optical component part having a focal length is provided in the optical path of the laser beam at a distance from the output mirror. The optical component part modifies the laser beam in respect of its optical path into an improved one. Thus, the propagating characteristic of the laser beam is varied by the optical component, and accordingly, the position of the optimum machining region is changed. More specifically, the optimum machining region changes with the focal length and the distance from the output mirror of the optical component part, which permits the optimum machining region to be created as desired by properly selecting the focal length and the distance of the optical component part. As a result, it is possible to constantly put the machining point within the optimum machining region.

3 Claims, 6 Drawing Sheets

LASER BEAM MACHINE USING OPTICAL COMPONENT TO MODIFY LASER BEAM AS DESIRED

BACKGROUND OF THE INVENTION

1. Field of the Invention

This invention relates to a laser beam machine for condensing a laser beam and irradiating the resulting laser beam onto a workpiece to machine the workpiece.

2. Description of the Related Art

Conventionally, a laser oscillator uses an output mirror of which radius of curvature on the emission side is positive (+). Accordingly, the laser beam emitted from the laser oscillator has a propagating characteristic that it is normally reduced in diameter in the course of transmission, and then diverges. Further, the laser beam has a property that it undergoes changes in beam mode or beam shape, during transmission, due to thermal lens effect on the output mirror of the laser oscillator and noise components generated by interference occurring between walls of a discharge tube and laser beam within the tube.

Therefore, the laser beam emitted from the laser oscillator cannot be controlled to be uniform throughout the course of its transmission. That is, there is the optimum machining region in the course of transmission of the laser beam, at which excellent laser beam machining can be effected.

When a laser oscillator newly developed is used, it is necessary to conduct an experiment for confirming whether the optimum machining region exists. As a result of this experiment, the optimum machining region of the laser oscillator is extracted.

On the other hand, laser beam machines are fixedly installed for indoor use at respective locations. Therefore, the distance between a laser oscillator and a machining point set on a workpiece is restricted by the layout of machines or units including the laser beam machine.

Therefore, even if such a layout prevents an actual machining point set to the workpiece from falling within the optimum machining region, a conventional laser beam machine has to perform laser beam machining under the condition of the layout. In such a case, the machining capability inherent to the laser oscillator cannot be fully exerted.

To solve the problem, a laser beam machine adapted to constantly set the machining point within the optimum machining region has already been proposed, and put into practical use.

FIG. 4 shows a first example of the conventional laser beam machine adapted to constantly set the machining point within the optimum machining region. The laser beam machine shown in FIG. 4 is comprised of a turning mirror block 61 arranged at an intermediate point of an optical path of a laser beam 101, whereby the length of the optical path from the laser oscillator 60 up to a nozzle (laser beam-emitting point) 62 is held constant. The optical path length is set such that the nozzle 62 positioned at the front end of the optical path exists within the optimum machining region R101. As the machining point of the workpiece moves, the nozzle 62 moves within a range of a distance L and accordingly, the reflection mirror 61 also moves by a distance of L/2. In this case, the length of the optical path is held constant. More specifically, even if the machining point moves, the machining point is constantly positioned within the optimum machining region R101.

FIG. 5 shows a second example of the conventional laser beam machine adapted to constantly set the machining point within the optimum machining region. The FIG. 5 laser beam machine has an expansion joint 72 arranged at an intermediate point of an optical path of a laser beam 102. The laser beam reaches a nozzle 73 via a reflection mirror 71 and the expansion joint 72. The length of the optical path is set in advance such that the nozzle 73 positioned at the front end of the optical path exists within the optimum machining region R102, similarly to the case of FIG. 4. When the machining point moves, this movement is followed up by the operation of the expansion joint 72. This causes a slight variation in the length of the optical path, but the amount of the variation is very small compared with the whole length of the optical path length, and hence the optical path is substantially held constant. Therefore, in this case as well, the machining point is always positioned within the optimum machining region R102.

FIG. 6 shows a third example of the conventional laser beam machine adapted to constantly set the machining point within the optimum machining region. The FIG. 6 laser beam machine has a collimator (beam expander) 80 arranged at a stage posterior to the laser oscillator, which comprises a pair of lenses 81, 82 as shown in the figure. The collimator 80 changes a propagating characteristic of a laser beam 103 emitted from the laser oscillator, whereby the laser beam 103 is adjusted such that the optimum machining region covers an actual machining point. Further, as shown in the figure, there is a type in which a movement mechanism 84 driven by a servomotor 83 is additionally provided for the lens 82 at the latter stage of the collimator 80. The movement mechanism 84 makes it possible to change the diameter of the laser beam on a condensing lens positioned at the final stage, as desired, whereby the optimum machining region can be created as desired.

However, these examples of the prior art suffer from the problem that although they can put the machining position within the optimum machining region, the number of additional component parts required therefor is markedly large, resulting in a marked increase of manufacturing costs and degradation of reliability thereof.

Further, the increase of component parts makes deviation of the optical axis liable to occur. Moreover, in the case of the movement mechanism 84 being additionally provided for the collimator 80, it is often impossible to form a laser beam on the condensing lens such that it has a diameter as determined by calculation.

Further, in the case of a large-sized laser machine, it is required to generate a laser beam having such a propagating characteristic that the optimum machining region is positioned at a location considerably far from the laser oscillator. To this end, it is also necessary to design an exclusive laser oscillator.

In short, it is necessary to provide laser oscillators which are adapted for use with individual laser beam machines, which results in changes in the development, design, production, and maintenance of laser oscillators made on all occasions. This leads to an immense amount of increase in manufacturing costs of laser beam machines resulting therefrom.

SUMMARY OF THE INVENTION

The present invention has been made in view of these circumstances, and the object thereof is to provide a laser beam machine which is capable of creating the optimum machining region dependent on a laser oscillator as desired and with ease, thereby reducing manufacturing costs of the laser beam machines.

To attain the object, the present invention provides a laser beam machine for condensing a laser beam and irradiating the laser beam onto a workpiece to effect laser beam machining of the workpiece, which comprises a laser oscillator for emitting a laser beam such that the laser beam diverges at a diverging angle without having a propagating characteristic that the diameter of the laser beam is reduced in the course of transmission, and an optical component part arranged at a location positioned at a predetermined distance from an output mirror of the laser oscillator in the direction of emission of the laser beam, the optical component part having a predetermined focal length.

The laser beam emitted from the output mirror diverges at a diverging angle without the propagating characteristic that its diameter diminishes in the course of transmission. The optical component part having a predetermined focal length is provided in the optical path of the laser beam at a predetermined distance from the output mirror of the laser oscillator. The propagating characteristic of the laser beam is varied by the optical component, and accordingly, the position of the optimum machining region is changed. In short, it is possible to create the optimum machining region as desired by properly selecting the focal length and the distance from the output mirror of the optical component part.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIGS. 2(A) to 2(C) are diagrams showing examples of shifts in the optimum machining region made by respective optical component parts, in which FIG. 2(A) shows a first example, FIG. 2(B) a second example, and FIG. 2(C) a third example;

DESCRIPTION OF THE PREFERRED EMBODIMENT

The invention will now be described in detail with reference to drawings showing an embodiment of the invention.

Figure 1:
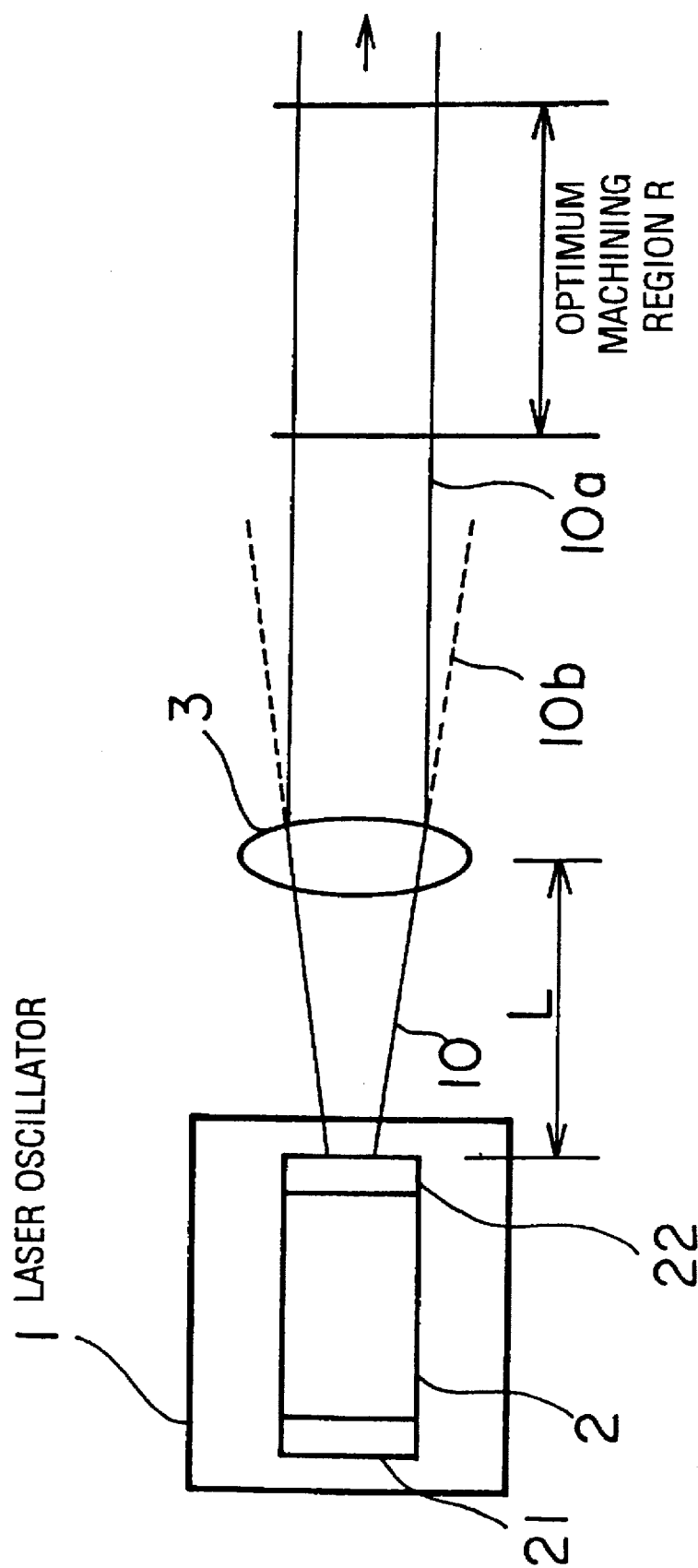
FIG. 1 is a diagram schematically showing the arrangement of a laser beam machine according to the invention.

FIG. 1 schematically shows the arrangement of a laser beam machine according to the invention. In the figure, reference numeral 1 designates a laser oscillator of the laser beam machine, within which a discharge tube 2 is provided as a resonator. The discharge tube 2 has a total reflection mirror 21 and an output mirror 22 arranged on opposite ends thereof. A laser beam 10 is emitted from the output mirror 22 of the discharge tube 2, and irradiated onto a machining point via an optical component part 3 and a condensing lens, not shown.

The output mirror 22 is constructed such that its radius of curvature on the emission side is equal to infinity or a negative value. The laser beam 10 emitted from the output mirror 22 diverges at a diverging angle without the propagating characteristic that its diameter diminishes in the course of transmission through part of the optical path. Therefore, without the optical component part 3, the laser beam diverges as indicated by broken lines 10b. The optical component part 3 is provided in the optical path of the laser beam 10 at a distance L from the output mirror 22. The optical component part modifies the laser beam 10 in respect of its optical path into an improved one 10a as shown in the figure.

Thus, the propagating characteristic of the laser beam 10 is varied by the optical component part 3, and accordingly, the position of the optimum machining region R is changed. More specifically, the optimum machining region R changes with the focal length F of the optical component part 3 and the distance L from the output mirror 22, which permits the optimum machining region R to be created as desired by properly selecting the focal length F and the distance L. As a result, it is possible to constantly put the machining point within the optimum machining region R.

Figure 2A:
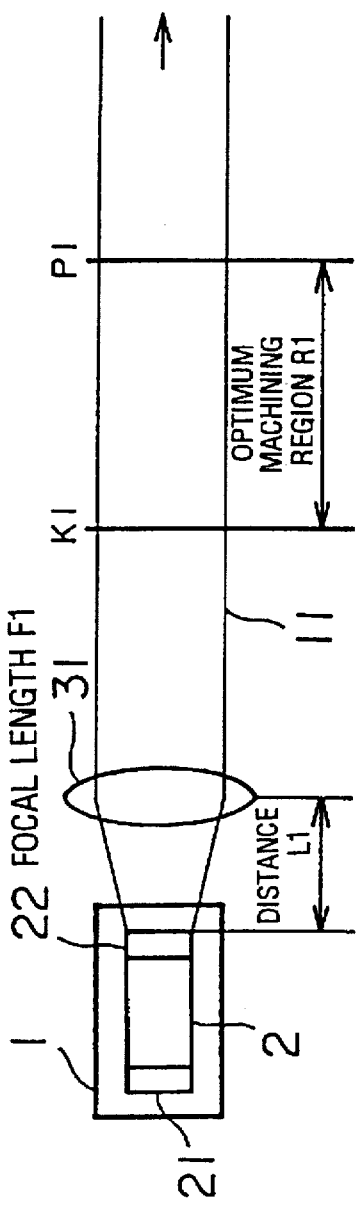
Figure 2B:
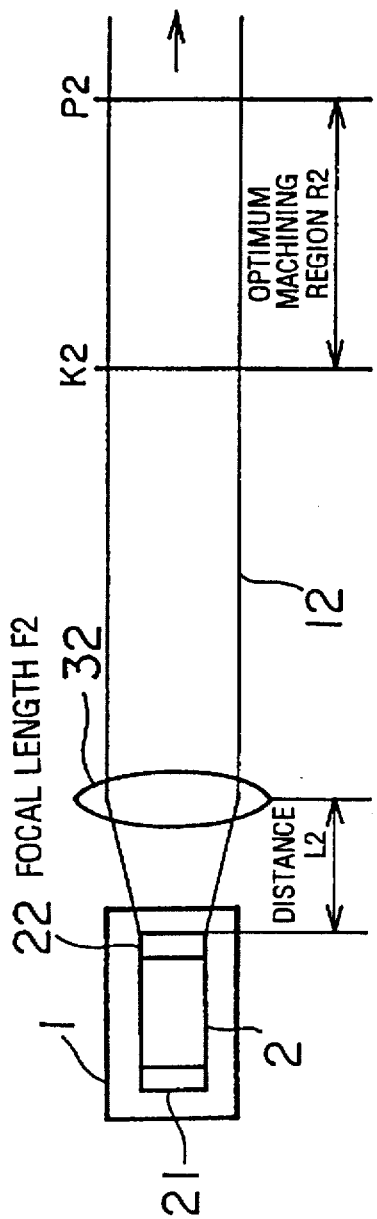
Figure 2C:
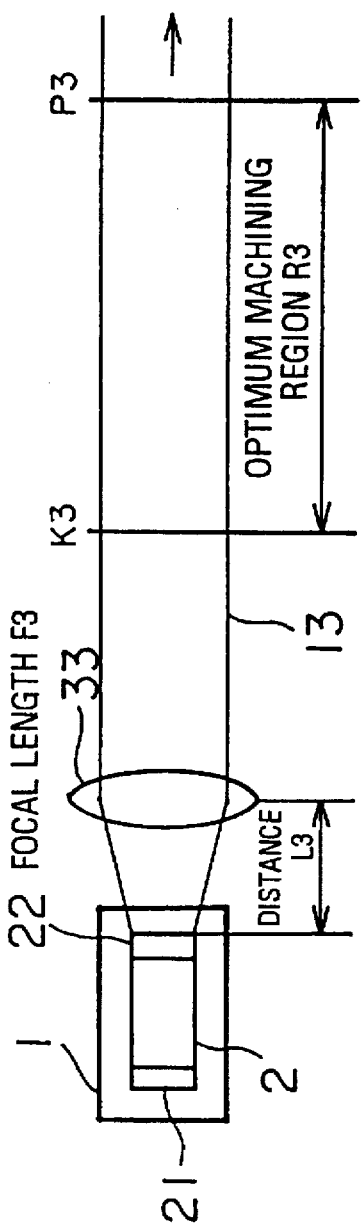

FIGS. 2(A) to 2(C) show examples of shifts in the optimum machining region caused by respective optical component parts. FIG. 2(A) shows a first example, FIG. 2(B) a second example, and FIG. 2(C) a third example.

As shown in FIG. 2(A), if an optical component part 31 having a focal length F1 is arranged at an intermediate point of the optical path of a laser beam 11 at a distance L1 from the output mirror 22, the optimum machining region R1 of the laser beam oscillator 1 is positioned between the shortest optical path length K1 and the longest optical path length P1.

If the optical component part 31 alone is replaced by an optical component part 32 while using the same laser oscillator as the laser oscillator 1, and the optical component part 32 having a focal length F2 is arranged at an intermediate point of the optical path of a laser beam 12 at a distance L2 from the output mirror 22, the optimum machining region R2 of the laser oscillator 1 is changed relative to the optimum machining region R1, and positioned between the shortest optical path length K2 and the longest optical path length P2, as shown in FIG. 2(B).

Further, if the optical component part 31 alone is replaced by an optical component part 33 while using the same laser oscillator as the laser oscillator 1, and the optical component part 33 having a focal length F3 is arranged at an intermediate point of the optical path of a laser beam 13 at a distance L3 from the output mirror 22, the optimum machining region R3 of the laser oscillator 1 is changed relative to the optimum machining region R1, and positioned between the shortest optical path length K3 and the longest optical path length P3.

Thus, by selecting a combination of a focal length F and a setting position of the optical component part 3 (distance L from the output mirror 22), it is possible to create the optimum machining region R of the laser oscillator 1 as desired. Data of possible combinations of values of the focal length F and setting positions of the optical component part 3 can be extracted in advance by conducting machining tests of the laser oscillator 1.

Figure 3:
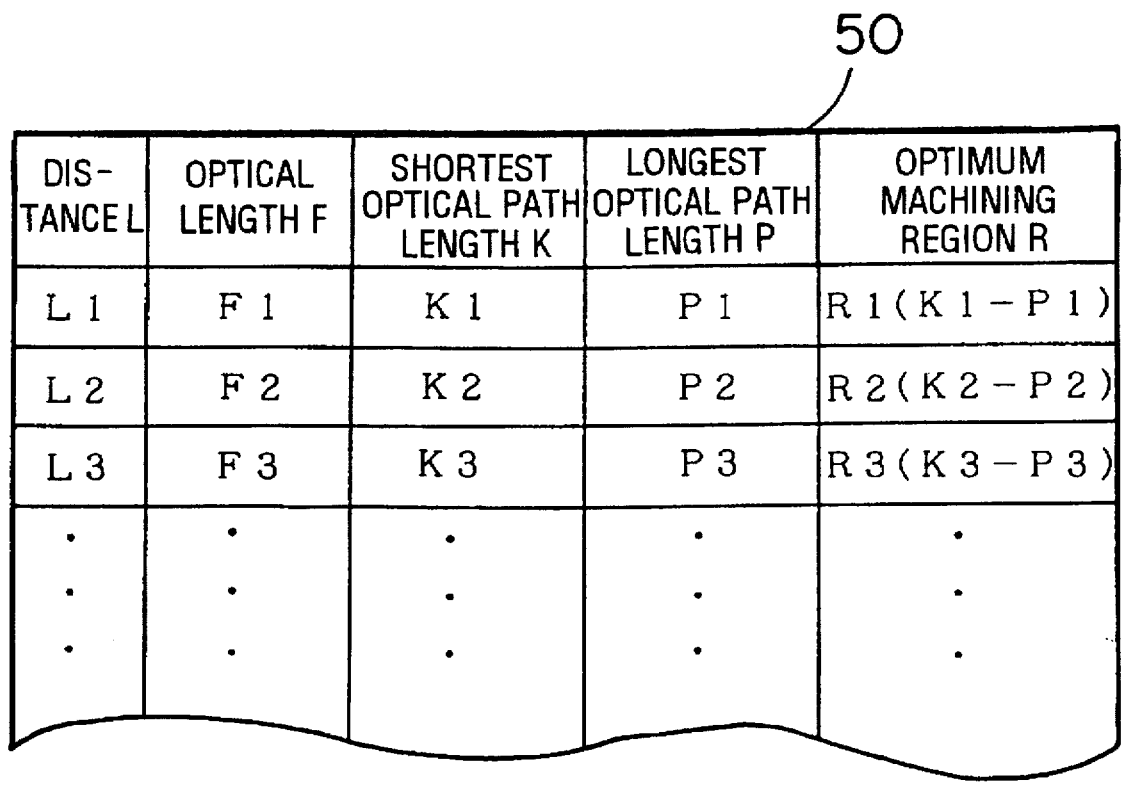
FIG. 3 is a diagram showing an example of a table containing combinations of values of focal length and setting positions of the optical component part.
Figure 4:
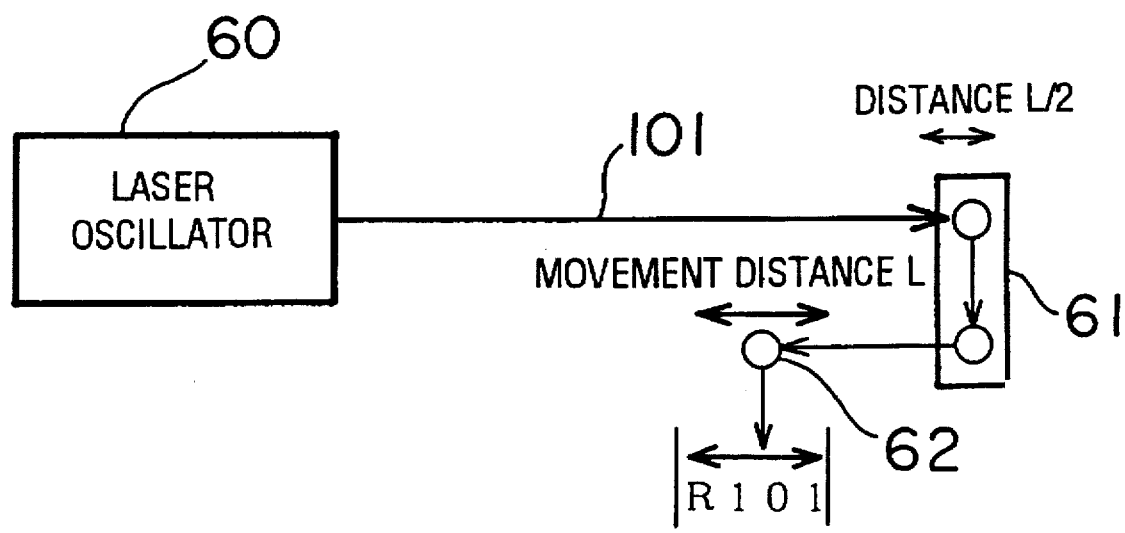
FIG. 4 is a diagram showing a first example of the conventional laser beam machine adapted to constantly set the machining point within the optimum machining region.
Figure 5:
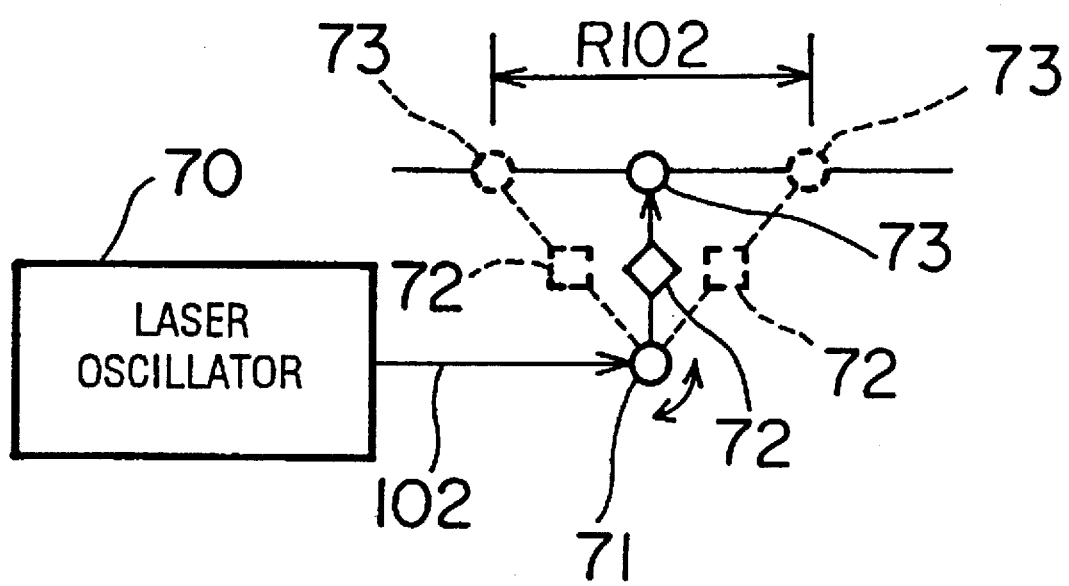
FIG. 5 is a diagram showing a second example of the conventional laser beam machine adapted to constantly set the machining point within the optimum machining region.
Figure 6:
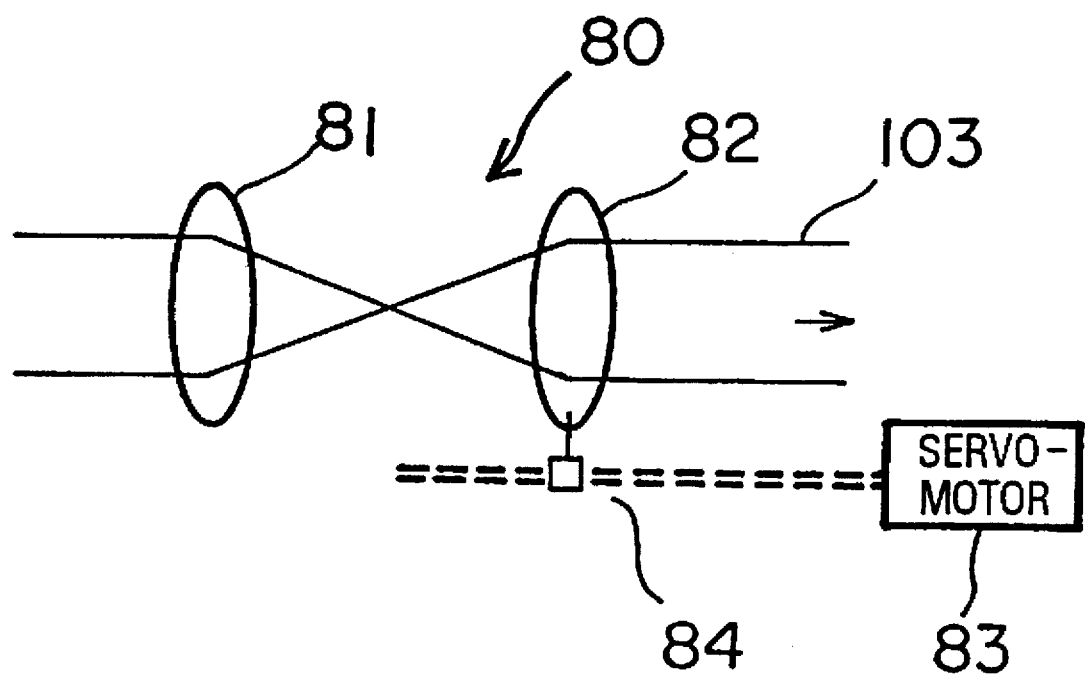
FIG. 6 is a diagram showing a third example of the conventional laser beam machine adapted to constantly set the machining point within the optimum machining region.

FIG. 3 shows an example of a table containing combinations of values of the focal length F and setting positions of the optical component part 3 for determining the optimum machining regions, i.e. a region table 50 shows the optimum machining regions R set according to combinations of the focal length F and the distance L from the output mirror 22, including the FIGS. 2(A) to 2(C) examples.

The region table 50 extracted in advance for each laser oscillator 1 for use therewith enables the optimum machining region R to be created as desired upon occasion. Therefore, users of the laser beam machine are provided with an increased selection range of the optimum machining regions, thereby increasing the degree of freedom of layout in installing the laser beam machine.

Further, since the optical component part 3 alone is required to be changed while using an identical laser oscillator 1, the optimum machining region R can be created with ease. Therefore, it is possible to improve efficiency of development of the laser oscillator 1, and reduce manufacturing cost of same.

Further, since the optical component part 3 alone is used as an additional component part, it is possible to reduce the number of component parts. In this respect as well, it is possible to reduce the manufacturing cost. Further, reliability of the laser beam machine can be improved.

As described heretofore, according to the present invention, by selecting a combination of the focal length and the setting position of an optical component part, it is possible to create the optimum machining region of the laser oscillator as desired. Therefore, users of the laser beam machine are provided with an increased selection range of the optimum machining regions, thereby increasing the degree of freedom of layout in installing the laser beam machine.

Further, since the optical component part alone is required to be changed while using an identical laser oscillator, the optimum machining region R can be created with ease. Therefore, efficiency of development of the laser oscillator can be improved, and manufacturing cost of same can be reduced. Further, since the optical component part alone is used as an additional component part, it is possible to reduce the number of component parts. In this respect as well, it is possible to reduce the manufacturing cost. Further, reliability of the laser beam machine can be improved.

The foregoing is considered as illustrative only of the principles of the present invention. Further, since numerous modification and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A laser beam machine for condensing a laser beam and irradiating said laser beam onto a workpiece to effect laser beam machining of said workpiece, comprising:

a laser oscillator including an output mirror to emit a laser beam such that said laser beam diverges at a diverging angle without having a propagating characteristic that the diameter of said laser beam is reduced in the course of transmission; and an optical component part having a selected focal length and arranged at a location positioned at a selected distance from said output mirror of said laser oscillator in the direction of emission of said laser beam, to modify an optical path of said laser beam emitted from said laser oscillator such that a machining point of said workpiece is set within an optimum machining region of said laser beam based on said selected distance and said selected focal length.

2. A laser beam machine according to claim 1, wherein said selected distance and said selected focal length are determined such that a range between the shortest distance of said machining point from said output mirror and the longest distance of said machining point from said output mirror, determined by layout, is set to the optimum machining region.

3. A laser beam machining according to claim 1, wherein said output mirror has a radius of curvature on an emission side thereof, which is equal to infinity or a negative value.

* * * * *